(12) United States Patent
Chang et al.

(10) Patent No.: US 7,879,467 B2
(45) Date of Patent: Feb. 1, 2011

(54) MEDIA FOR RECORDING DEVICES

(75) Inventors: Jack Chang, Fremont, CA (US); Mohammad Mirzamaani, San Jose, CA (US); Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/653,808

(22) Filed: Dec. 14, 2009

(65) Prior Publication Data

US 2010/0104893 A1 Apr. 29, 2010

Related U.S. Application Data

(62) Division of application No. 11/644,342, filed on Dec. 22, 2006, now Pat. No. 7,670,694.

(51) Int. Cl.
*G11B 5/66* (2006.01)

(52) U.S. Cl. .................................................. 428/831
(58) Field of Classification Search .................. None
See application file for complete search history.

(56) References Cited

U.S. PATENT DOCUMENTS

2005/0233174 A1* 10/2005 Munteanu et al. ........... 428/828
2007/0237986 A1* 10/2007 Wu et al. ................. 428/831.2

* cited by examiner

*Primary Examiner*—Holly Rickman
(74) *Attorney, Agent, or Firm*—Darren Gold

(57) ABSTRACT

Improvements to magnetic recording device including magnetic recording media are described. The improvements include the addition of copper to the recording layer as well as improved underlayers. In addition, improved manufacturing processes and magnetic/recording properties for media through heating and oxidation are described.

15 Claims, 4 Drawing Sheets

| CoPt15Cr11B15Cu2 |
|---|
| CoPt15Cr25B6 |
| CoCr22 |
| CrMo25Zr2 |
| CrTi22 |
| CrTi10B2 |
| Co30W70 |
| CrTi50 |

*FIG. 2a*

| CoPt15Cr11B15Cu2 |
|---|
| CoPt15Cr25B6 |
| Ru |
| Mo70V30 |
| CrMo20 |
| CrMn20 |
| Co30W70 |
| CrTi50 |

*FIG. 2b*

| CoPt15Cr11B15Cu2 |
|---|
| CoPt15Cr25B6 |
| Ru |
| Mo70V30 |
| CrMo20Zr2 |
| CrMn20 |
| Co30W70 |
| CrTi50 |

| CoPt15Cr11B15Cu2 |
| --- |
| CoPt15Cr25B6 |
| Ru |
| CoCr10 |
| CrMo20 |
| CrMn20 |
| Co30W70 |
| CrTi50 |

FIG. 4

| COC |
| --- |
| CoPtCrBCu |
| CoPtCrBCu |
| Ru |
| CoCrZr |
| CrMoC |
| CrMoBMn |
| CrMn |

FIG. 5

| Carbon overcoat |
| --- |
| $CoPt_{13}Cr_{11}B_{15}Cu4$ |
| $CoPt_{14}Cr_{25}B_7Cu4$ |
| Ru |
| MoCr30 |
| $CrMn_{20}$ |
| Flash CoW50 |
| $CoW_{60}$ + Oxidation |
| $CrTi_{50}$ |

MEDIA FOR RECORDING DEVICES

RELATED APPLICATION

This application is a divisional of application Ser. No. 11/644,342 filed on Dec. 22, 2006 now U.S. Pat. No. 7,670,694.

BACKGROUND OF THE INVENTION

A typical prior art disk drive system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

Media typically has several parameters which indicate the media performance. The parameters include orientation ratio (OR), signal to noise ratio (SNR), magnetic moment (Mrt), soft error rate (SER), and energy barrier for magnetic switching (KuV/kT). As these parameters typically have trade-offs between each other, it is important to create media which tunes these parameters to improve the overall performance of the media.

What is needed are media with various thin film layers that optimize media structure to improve the overall performance of the media through tuning of the parameters.

SUMMARY OF THE INVENTION

Media are described which improve the overall performance of the media by adding or adjusting thin film layers of the media. These layers include the seed layers, underlayers and recording layers. Also, process steps while manufacturing the media are used to enhance the performance of the media.

High OR, SNR and corrosion resistivity can be achieved with properly selected underlayers. Further, specific magnetic recording layers provide good overwrite (OW). Lastly, SNR, SER and KuV/kT can be simultaneously improved with the selection of appropriate underlayers and magnetic recording layers. In addition, heating a substrate prior to deposition of a first layer can help remove contaminations on the substrate and thus reduce defects.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIGS. 2a-2d are embodiments of media.

FIG. 4 is an embodiment of media.

FIG. 5 is a further media embodiment.

DETAILED DESCRIPTION OF THE INVENTION

Figure 1:
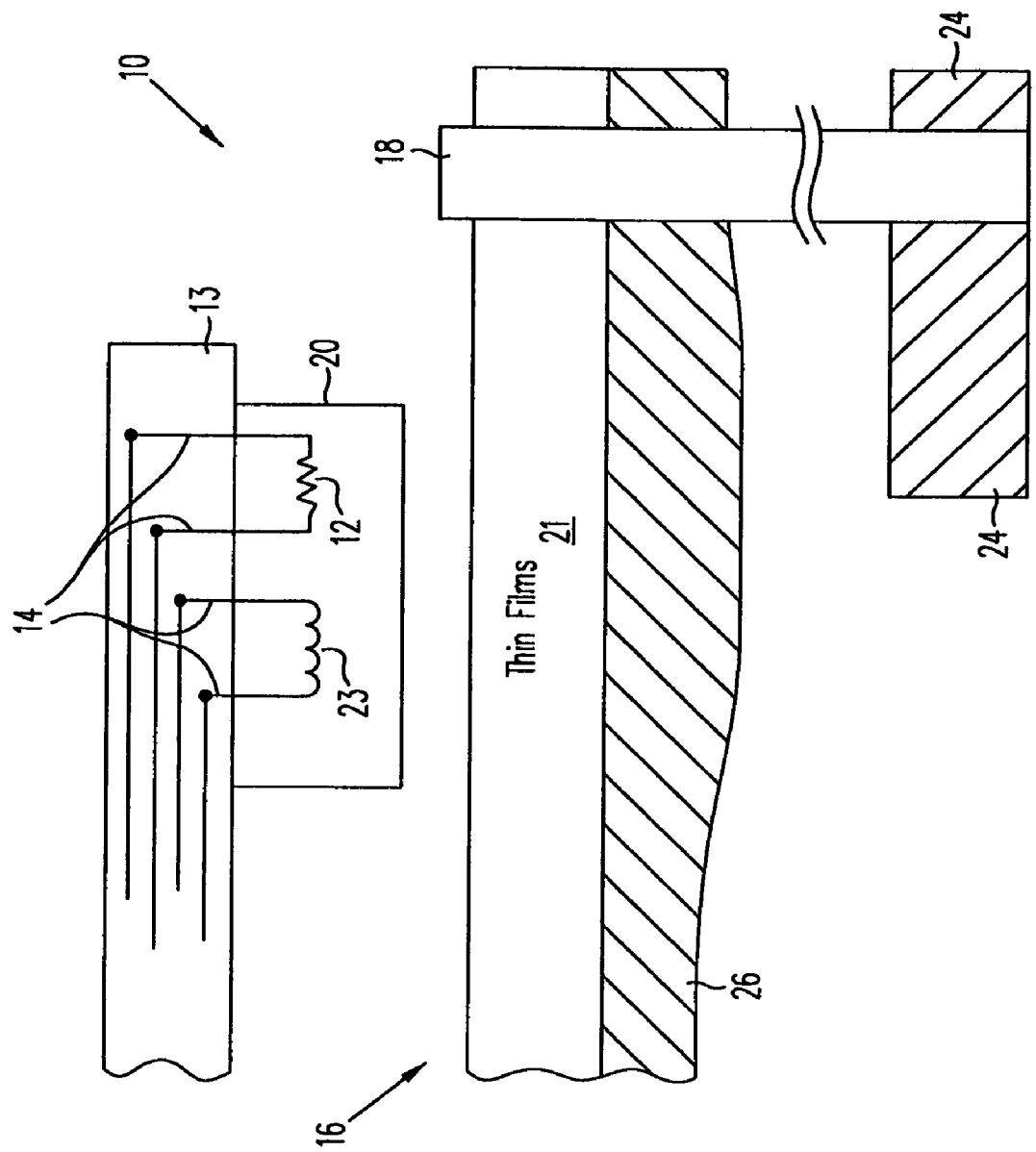
FIG. 1 is a symbolic illustration of the prior art showing the relationships between the head and associated components in a disk drive.

The following description is of the best embodiments presently contemplated for carrying out this invention. This description is made for the purpose of illustrating the general principles of this invention and is not meant to limit the inventive concepts claimed herein.

Within the application a compound or alloy described in a manner such as XY60 would include 40 at. % X and 60 at. % Y.

The embodiments described herein are useful for media in general and in particular useful for longitudinal media used in hard disk drives. Of course concepts used in one disclosed embodiment can be used with other disclosed embodiments.

Several embodiments are useful for improving orientation ratio (OR) which in turn helps to improve the signal to noise ration (SNR). These embodiments involve heating the substrate before depositing thin film layers onto the substrate. Heating the substrate helps to remove materials absorbed on the substrate surface such as organics and water.

The process for creating such a media is as follows. First, a textured glass substrate is pre-heated. Second, a layer of CrTi is sputter deposited onto the substrate. Third, a layer of CoW is sputter deposited onto the CrTi. Fourth, the surface of the CoW is oxidized by introducing oxygen into a sputter chamber. Fifth, an underlayer of CrTiB, CrMn or CoW are sputter deposited onto the oxidized CoW layer. Sixth, magnetic recording layers, such as CoCrPtBCu alloys, are sputter deposited onto the underlayer.

Various ranges and compositions of materials can be used for the above design. The ranges for the composition and thickness for the CrTi layer is Ti 35 at. %. to 76 at. % and 10-50 nm. The ranges for the composition and thickness for the CoW layer is W 30 at. % to 70 at. % and 3-6 nm. The range for the composition and thickness for the CrTiB underlayer is Ti 6-14 at. % and B 1-5 at. % and is 1-3 nm. The range for the composition and thickness for the CrMn underlayer is Mn 10-30 at. % and 1-3 nm. The range for the composition and thickness for the CoW underlayer is 30 at. % to 70 at. % and 0.1-1 nm. Further, the magnetic recording layers include one or more layers of CoPtCr and optionally Cu and/or B. The magnetic recording layers can be formed of CoPtCr alloys as described in TABLE 1a below.

Four exemplary disks as described below provide four different ORs and show the effect of altering an underlayer of the media. FIG. 2a shows a first embodiment of a disk. The OR of the disk of FIG. 2a is 1.75. FIG. 2b shows a second embodiment of a disk. The OR of the disk of FIG. 2b is 1.86. FIG. 2c shows a third embodiment of a disk. The OR of the disk of FIG. 2c is 1.95. FIG. 2d shows a fourth embodiment of a disk. The OR of the disk of FIG. 2d is 1.85.

Another embodiment of media provides for a high OR and SNR. The underlayers are selected so that the disk is additionally highly corrosion resistive. Further, the magnetic recording layers provide good overwrite (OW).

This embodiment includes a 30 nm CrTi50 pre-seed layer sputter deposited onto a circumferentially textured substrate followed by sputter deposition of a 4.3 nm CoW60 layer. In addition, the ranges for the composition and thickness for the CrTi pre-seed layer is Ti 35 at. % to 76 at. % and 10-50 nm. Further, the ranges for the composition and thickness for the CoW layer is W 30 at. % to 70 at. % and 3-6 nm.

After the CoW layer is deposited, the disk surface is oxidized in situ by introducing $O_2$ gas into the sputter station. Then the disk is heated in the range of 100-400 degrees Celsius. After heating, a 0.4 nm layer of CoW is sputtered onto the disk. The ranges for the composition and thickness for this CoW layer is 30 at. % to 70 at. % and 0.1-1 nm. After the CoW layer is added, the following layers are deposited in order onto the CoW layer: CrMn20 (preferably 1.7 nm and generally 1-3 nm), MoCr30 (preferably 2.0 nm and generally 0.5-3.5 nm), Ru (3.5 nm), CoPt14Cr25B7Cu4 (bottom magnetic recoding layer), CoPt13Cr11B15Cu4 (top magnetic recording layer), and a carbon overcoat. The thickness of the two magnetic recording layers together is 17.3 nm. In general both the top and bottom magnetic recording layers are each 5-13 nm in thickness. The ranges for the compositions for these layers are listed in TABLES 1a and 1b below.

TABLE 1a

|  | Pt | Cr | B | Cu |
|---|---|---|---|---|
| Top Magnetic Recording Layer | 11-15 at. % | 8-13 at. % | 12-17 at. % | 0.5-6 at. % |
| Bottom Magnetic Recording Layer | 11-15 at. % | 20-30 at. % | 4-9 at. % | 0.5-6 at. % |

TABLE 1b

|  | Mn | Cr | Mo |
|---|---|---|---|
| CrMn | 10-30 at. % | 70-90 at. % | — |
| MoCr | — | 15-45 at. % | 55-85 at. % |

The media described preferably above provides for an OW (1T/10T db) of around 28.1 and an OR of around 1.8-2.3.

TABLE 2 demonstrates improved corrosion resistance of such a media with a MoCr30 underlayer against a disk with an MoV20 underlayer. As can be seen, MoV20 is more prone to delamination and thus corrosion.

TABLE 2

|  | Thickness (Ang) | | | | |
|---|---|---|---|---|---|
|  | 46 | 39 | 33 | 26 | 20 |
| Underlayer: MoV20 | Delamination | Delamination | No Delamination | No Delamination | No Delamination |
| Underlayer: MoCr30 | No Delamination | No Delamination | No Delamination | No Delamination | No Delamination |

Figure 3:
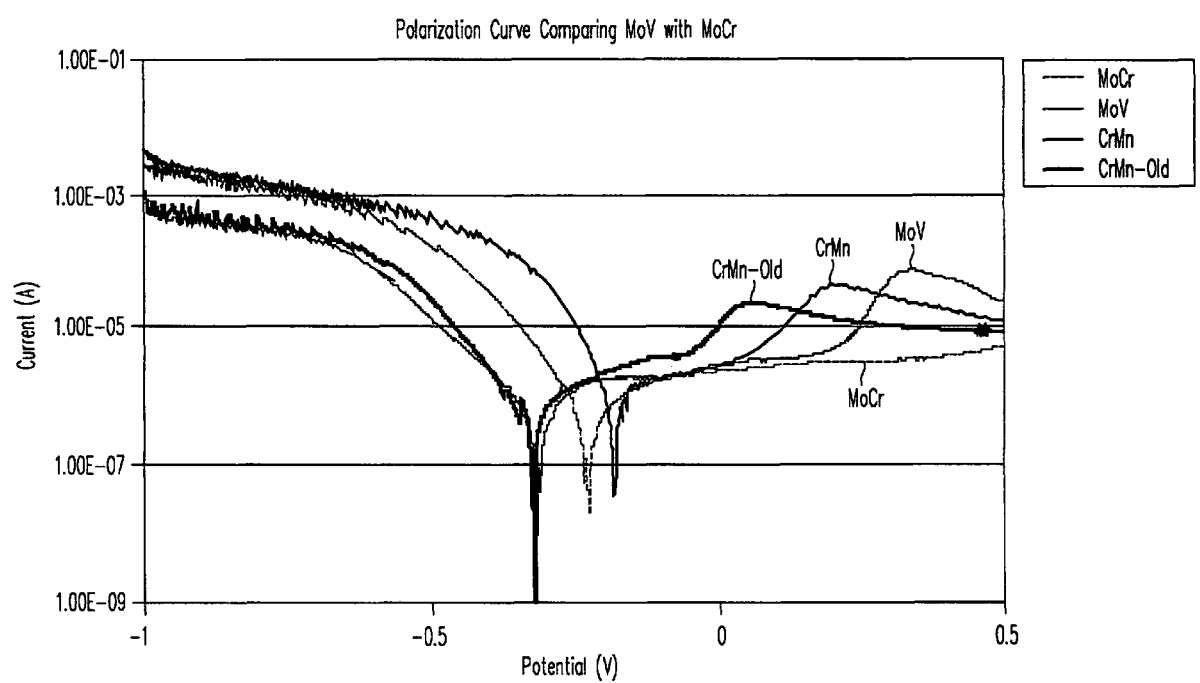
FIG. 3 is a polarization curve of a disk with an underlayer MoCr (Cr 30 at. %) and a disk with an underlayer of MoV (V 20 at. %).

FIG. 3 shows the polarization curve of a disk with MoCr30 and a disk with an underlayer of MoV20. As can be seen, MoCr30 has a lower potential and thus is more resistive to corrosion.

A further embodiment of media provides for high SNR and SER. The embodiment also improves the KuV/kT, which can be degraded when improving the SNR and SER. These improvements are accomplished through reducing the grain size of the underlayer. The reduced grain sized can be implemented with a three level underlayer, such as CrMn, CrMoBMn, and CrMoC. Reducing the grain size causes the V term to be reduced. Thus, the Ku of the media is increased to compensate for the reduction in the V term. The Ku is then increased by using a CoCrPtB alloy with the addition of 1-4 at. % of Cu.

TABLE 3 demonstrates that as the KuV/kT is increased the Mrt also increases. However the SNR tends to go down as KuV/kT increases. The media for 1-3 in TABLE 3 are identical except that the magnetic recording layer thickness is increased from media 1 to 3. Thus, the KuV/kT increases as the thickness of the magnetic recording layer increases.

TABLE 3

|  | Mrt | Hc | TAALF | OW | PWnm | DCSNR | 4TSoNR | 2TSoNR | 1TSoNR | KuV/kT |
|---|---|---|---|---|---|---|---|---|---|---|
| 1 | 0.42 | 4250 | 1.492 | 33.9 | 105.5 | 32.0 | 30.6 | 29.0 | 24.4 | 76 |
| 2 | 0.44 | 4300 | 1.530 | 33.6 | 106.9 | 32.0 | 29.6 | 27.5 | 24.2 | 82 |
| 3 | 0.46 | 4350 | 1.576 | 33.4 | 108.7 | 32.0 | 28.6 | 25.5 | 24.0 | 86 |

TABLE 4 demonstrates the effects of tuning the Cr and B compositions in the bottom magnetic recording layer of a two layer magnetic recording layer. As TABLE 4 describes, as the grain size is reduced by increasing B content, SoNR is improved while KuV/kT is lessened.

TABLE 4

|   | M2 alloy | Mrt | TAALF | OvwrSA | PWNnm | DCSNR | 4TSoNR | 3TSoNR | 2TSoNR | 1TSoNR | KuV/kT |
|---|---|---|---|---|---|---|---|---|---|---|---|
| 1 | CoPt13Cr25B7 | 0.43 | 1.936 | 29.6 | 94.4 | 33.7 | 29.2 | 27.9 | 27.7 | 26.8 | 78 |
| 2 | CoPt13Cr25B6 | 0.43 | 1.934 | 30.2 | 94.2 | 33.6 | 29.0 | 27.7 | 27.4 | 26.6 | 82 |
| 3 | CoPt13Cr24B6 | 0.43 | 1.922 | 28.6 | 96.0 | 33.6 | 28.8 | 27.7 | 27.4 | 26.4 | 84 |

TABLE 5 demonstrates the advantage of using CoCrPt-BCu for the bottom magnetic recording layer. When Cu is added to bottom magnetic recording layer (row 1) the SNR, SER and KuVkT are all improved.

TABLE 5

|   |   | Mrt | Hc | TAALF | Ovwr | PWNnm | DCSNR | SoNR4T | SoNR2T | SoNR1.33T | SoNR1T | KuV/kT | SER |
|---|---|---|---|---|---|---|---|---|---|---|---|---|---|
| 1 | CrMn/CrMoBMn/CrMoC/CoCrZr/Ru/CoPtCrBCu/CoPtCrBCu | 0.46 | 4550 | 1.695 | 29.4 | 81.4 | 33.2 | 30.5 | 28.6 | 26.9 | 25.8 | 82 | 6.3 |
| 2 | CrMn/CrMoBMn/CrMoC/CoCrZr/Ru/CoPtCrB/CoPtCrBCu | 0.43 | 4550 | 1.654 | 30.1 | 81.7 | 33.1 | 30.5 | 28.4 | 26.7 | 25.6 | 76 | 5.8 |
| 3 | Cr/CrMoB/CrMo/CoCrZr/Ru/CoPtCrB/CoPtCrBCu | 0.45 | 4550 | 1.713 | 29.0 | 82.4 | 32.8 | 30.1 | 28.1 | 26.4 | 25.2 | 79 | 5.3 |

The range for the composition and thickness for the CrMn layer is (Thickness: 10 A-100 A, Mn: 1 at %-30 at %). The range for the composition and thickness for the CrMoBMn layer is (Thickness: 10-100 A, Mo: 1 at %-30 at %, B: 1 at %-6 at %, Mn: 1 at %-30 at %). The range for the composition and thickness for the CrMoC layer is (Thickness: 10-100 A, Mo: 1 at %-30 at %, C: 0.1 at %-4.0%). The range for the composition and thickness for the lower magnetic recording CoPtCrBCu layer is (Thickness: 10-200 A, Pt: 1 at %-30 at %, Cr: 1%-30 at %, B: 1 at %-25 at %, Cu: 0.5 at %-10 at %).

FIG. 5 is a further embodiment of media. It includes a 30 nm seed layer of CrTi50 on a substrate. Above the seed layer is a 4.3 nm CoW60 layer which is oxidized. Then a 0.4 nm flash layer of CoW50 is deposited. After that, a 1.7 nm CrMn20 layer is deposited followed by a 2.0 nm MoCr30 layer and subsequently, a 3.5 nm Ru layer. Lastly, a 17.3 nm dual magnetic layer of CoPt14Cr25B7Cu4/CoPt13Cr11B5Cu4 is deposited before applying a 0.3 nm carbon overcoat. TABLE 6 specifies the ranges for the thicknesses and composition of the various layers.

TABLE 6

|   | Thickness | Cr | W | Pt | B | Cu |
|---|---|---|---|---|---|---|
| CrTi | 5-60 nm | 35-63 at. % | — | — | — | — |
| CoW | 1-10 nm | — | 30-70 at. % | — | — | — |
| CoW | 0.1-1 nm | — | 30-70 at. % | — | — | — |
| CrMn | 0.5-5 nm | 65-95 at. % | — | — | — | — |
| MoCr | 0.5-5 nm | 10-50 at. % | — | — | — | — |
| Ru | 0.5-10 nm | — | — | — | — | — |
| CoPtCrBCu | 5-13 nm | 20-30 at. % | — | 10-16 at. % | 4-10 at. % | 0.5-10 at. % |
| CoPtCrBCu | 5-13 nm | 7-19 at. % | — | 10-16 at. % | 11-20 at. % | 0.5-10 at. % |

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. Recording media for a hard disk drive including:
   a first underlayer including MoCr;
   a second underlayer including Ru on the first underlayer;
   a third underlayer including CrMn under the first underlayer; and
   a magnetic recording layer on the second underlayer, wherein:
   the first underlayer includes 15-40 at. % Cr and
   the third underlayer includes 10-30 at. %, Mn and is 1-3 nm in thickness.

2. The recording media of claim 1, wherein the recording media is longitudinal.

3. The recording media of claim 1, wherein the first underlayer is 0.5-5 nm in thickness and the second underlayer is 0.5-10 nm in thickness.

4. The recording media of claim 1, wherein the magnetic recording layer includes a top magnetic recording layer and a bottom magnetic recording layer and wherein:
   the top magnetic recording layer includes a first CoPtCrBCu alloy;
   the bottom magnetic recording layer includes a second CoPtCrBCu alloy different from the first CoPtCrBCu alloy and
   the bottom magnetic recording layer is 0.5%-10% at. % Cu.

5. The recording media of claim 1, wherein the magnetic recording layer includes a top magnetic recording layer and a bottom magnetic recording layer and the top magnetic recording layer includes a CoPtCrBCu alloy.

6. The recording media of claim 1, wherein the magnetic recording layer includes a top magnetic recording layer and a bottom magnetic recording layer and the bottom magnetic recording layer includes a CoPtCrBCu alloy.

7. The recording media of claim 6, wherein the bottom magnetic recording layer includes 0.5%-10% at. % Cu.

8. The recording media of claim 4, wherein the first underlayer is 0.5-5 nm in thickness and the second underlayer is 0.5-10 nm in thickness.

9. The recording media of claim 5, wherein the first underlayer is 0.5-5 nm in thickness and the second underlayer is 0.5-10 nm in thickness.

10. The recording media of claim 6, wherein the first underlayer is 0.5-5 nm in thickness and the second underlayer is 0.5-10 nm in thickness.

11. The recording media of claim 7, wherein the first underlayer is 0.5-5 nm in thickness and the second underlayer is 0.5-10 nm in thickness.

12. A hard disk drive including:
   a media;
   a read head to read data from the media;
   a write head to write data to the media; wherein the media includes
      a first underlayer including MoCr;
      a second underlayer including Ru on the first underlayer;
      a third underlayer including CrMn under the first underlayer; and
      a magnetic recording layer on the second underlayer,
   wherein:
      the first underlayer includes 15-40 at. % Cr and
      the third underlayer includes 10-30 at. %, Mn and is 1-3 nm in thickness.

13. The hard disk drive of claim 12, wherein the recording media is longitudinal.

14. The hard disk drive of claim 12, wherein the first underlayer of the media is 0.5-5 nm in thickness and the second underlayer of the media is 0.5-10 nm in thickness.

15. The hard disk drive of claim 12, wherein the magnetic recording layer of the media includes a top magnetic recording layer and a bottom magnetic recording layer and wherein:
   the top magnetic recording layer includes a first CoPtCrBCu alloy;
   the bottom magnetic recording layer includes a second CoPtCrBCu alloy different from the first CoPtCrBCu alloy and the bottom magnetic recording layer includes 0.5%-10% at. % Cu.

* * * * *